Aug. 24, 1948.  B. G. MARSHALL  2,447,586
COMPRESSION TESTING AND LIKE APPARATUS
Filed Feb. 9, 1944  3 Sheets-Sheet 2
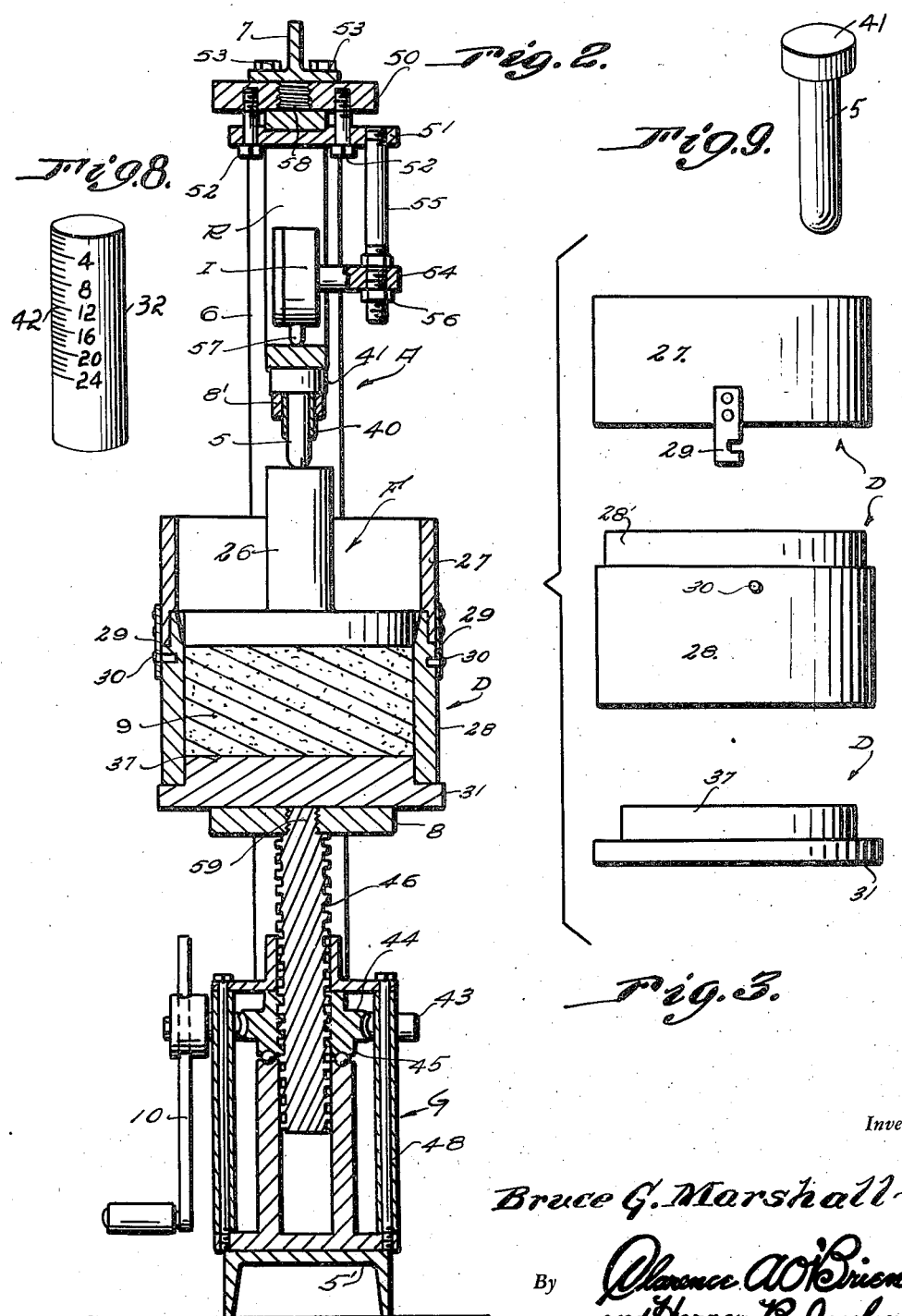
Inventor
Bruce G. Marshall
By Clarence A. O'Brien
and Harvey B. Jacobson
Attorneys Aug. 24, 1948.  B. G. MARSHALL  2,447,586
COMPRESSION TESTING AND LIKE APPARATUS
Filed Feb. 9, 1944  3 Sheets-Sheet 3
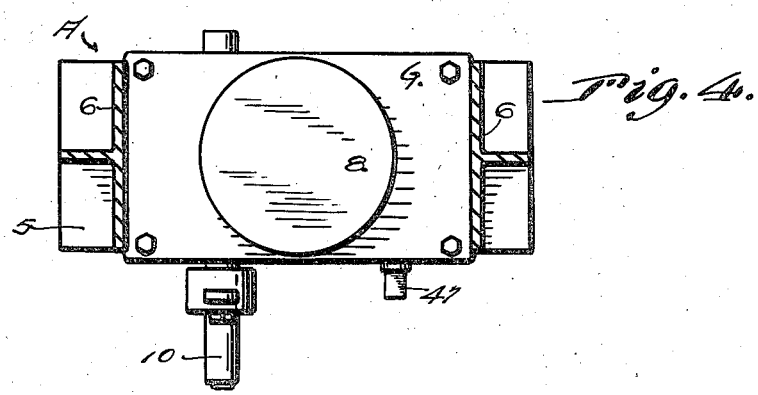
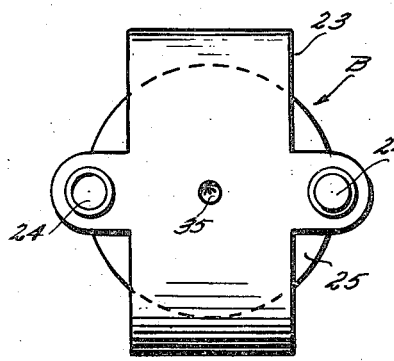
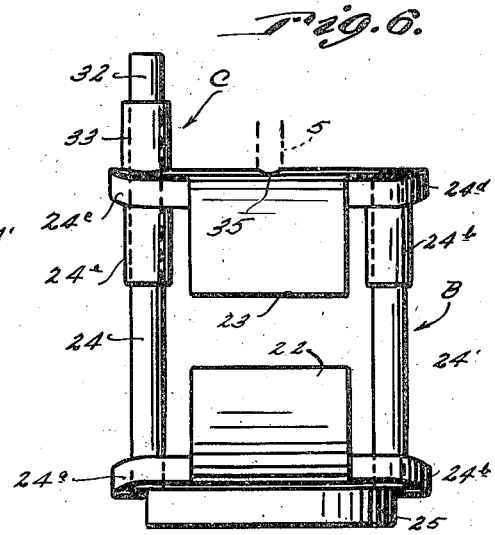
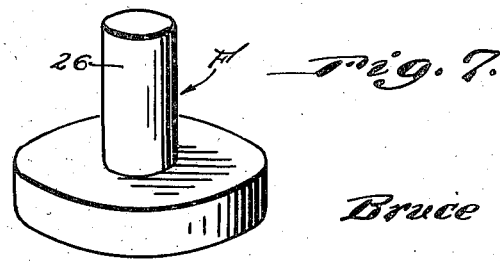
Inventor
Bruce G. Marshall
By Clarence A. O'Brien
and Harvey B. Jacobson
Attorneys Patented Aug. 24, 1948

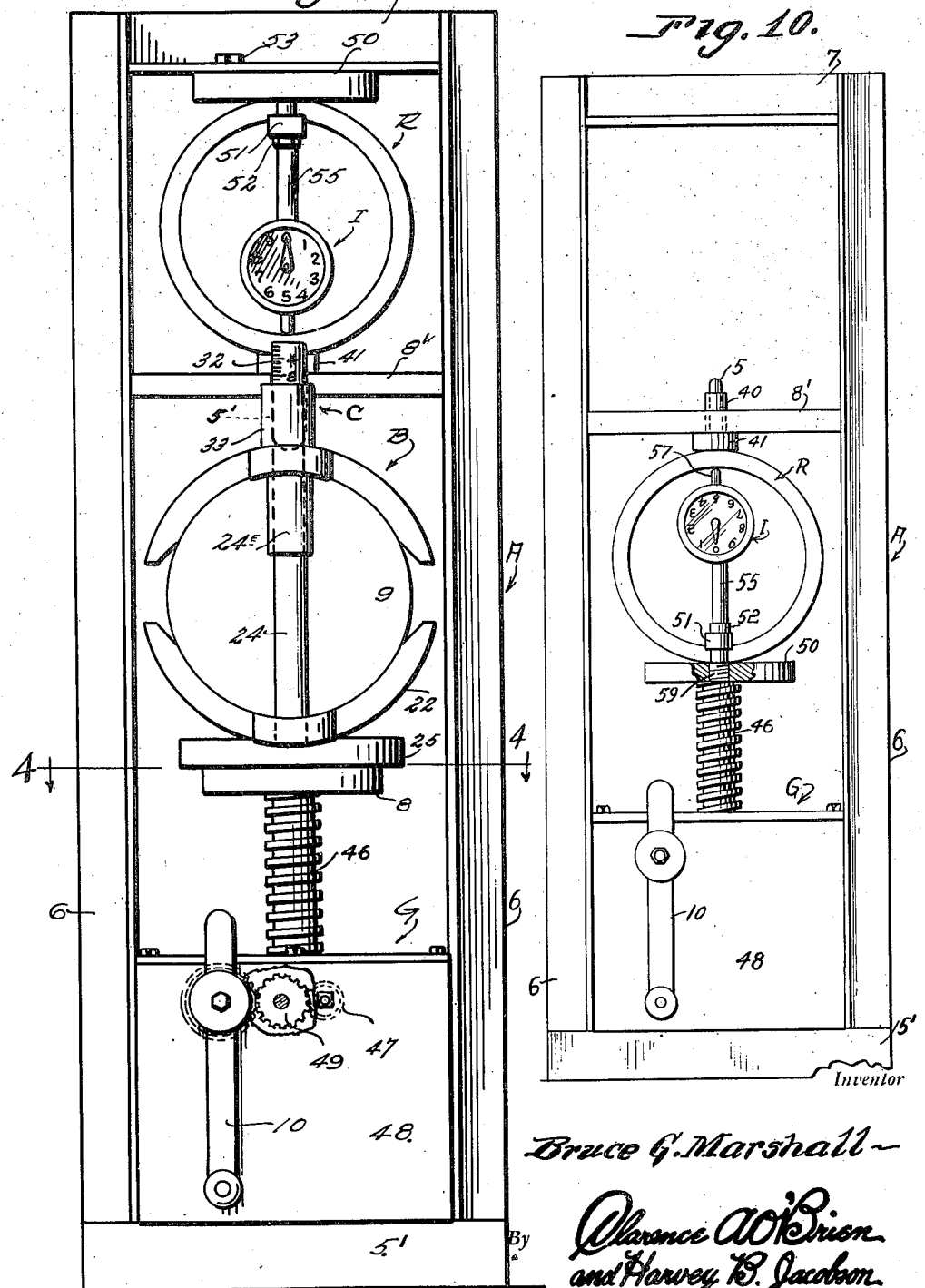

2,447,586

UNITED STATES PATENT OFFICE 2,447,586

COMPRESSION TESTING AND LIKE APPARATUS

Bruce G. Marshall, Vicksburg, Miss.

Application February 9, 1944, Serial No. 521,692

5 Claims. (Cl. 73—94)

This invention relates to an apparatus particularly designed for use in producing test specimens of bituminous paving mixtures and stabilized soil mixtures, and testing the quality and durability of said specimens, so that mixtures of controlled or predetermined quality and durability may be produced.

Bituminous paving mixtures are produced by mixing bituminous material with aggregates. Stabilized soil mixtures are produced by the use of any additional agent which will add to stability of the soil. The quality and durability of bituminous paving mixtures and stabilized soil mixtures depend on the quantity, quality, type and properties of the ingredients or materials used, and proper preparation and compaction of the mixture. By means of the present invention, exact qualities and quantities may be determined by trial, by varying the proportions and the quality and type of materials, and from the materials available, controlled mixtures can be produced so as to insure the desired predetermined qualities and durability in the finished pavements.

The simplicity, compactness and light weight of the apparatus makes possible its use where frequent transporting of this type of equipment is necessary. Simplicity of performing the test makes possible its advantageous use by unskilled operators. The technique of forming and then testing a specimen practically eliminates the entrance of human errors by different operators. These advantages render the apparatus valuable for both design criteria and for control of quality of bituminous paving mixtures on the job during construction.

The exact nature of the present invention and specific objects and features thereof will become apparent from the following description when considered in connection with the accompanying drawings. The present invention consists in the novel apparatus hereinafter more fully described, shown in the drawings and claimed.

In the drawings, wherein like reference characters indicate corresponding parts throughout the several views:

Figure 1 is a front elevational view showing part of the apparatus as it appears in use while testing a specimen.

Figure 2 is a central vertical sectional view of part of the apparatus as it appears when in use for producing a test specimen.

Figure 3 is a developed elevational view showing the parts of the compaction mold forming part of the present apparatus.

Figure 4 is a horizontal section taken on line 4—4 of Figure 1.

Figure 5 is a top plan view of the test mold forming part of the apparatus as shown in Figure 1.

Figure 6 is a side elevational view of the mold shown in Figure 5, together with the deformation indicating device.

Figure 7 is a perspective view of the compression head used in the compaction mold, as in Figure 2, in producing the test specimen.

Figure 8 is a perspective view of the movable graduated core of the deformation indicating device used in connection with the test mold, as in Figures 1 and 6.

Figure 9 is a perspective view of the contact pin employed between the proving ring and the test mold when testing specimens, or between the proving ring and the compression head when producing test specimens.

Figure 10 is a view similar to Figure 1, but with the specimen-testing mold removed and the proving ring assembly applied to the jack screw.

Referring in detail to the drawings, the essential parts of the apparatus are as follows:

1. A compaction mold D and a compression head or plunger F for use in compacting paving mixtures to produce specimens for testing.

2. A testing machine A by means of which load is applied to the mixture for compression in compaction mold D, and for use in measuring the stability and flow of specimens tested in test mold B. The essential parts of the testing machine A are a frame having a base 5', spaced uprights 6, top cross piece 7 and a second cross piece 8' at the upper portion of the frame but below the top cross piece 7. The machine further includes a screw jack G positioned between the uprights 6 and upon the base 5', a proving ring R which is resilient and of calibrated or predetermined spring strength, and a deflection or flexure indicating dial I.

3. A test mold B in which specimens are placed for testing as to stability and flow value.

4. A deformation indicating device C which is used to measure the degrees to which specimens deform at the times when failure occurs.

After production of a test mixture, a quantity of the mixture is placed in compaction mold D, as shown at 9 in Figure 2, the quantity being sufficient to fill the lower portion 28 of said mold and to produce the desired compacted specimen. Compaction is accomplished by first tamping the mixture and then applying static load thereon in the mold D. Compression head F is centered over the specimen in the compaction mold D, and the desired load is applied by use of the testing machine A, the compaction mold D being placed on jack head 8 of screw jack G and jack crank 10 being turned to force the rod 26 of compression head F up against the work-contacting pin 5 of the testing machine. The specimen is then removed from the compaction mold D for future testing.

In preparing the specimen for stability and flow testing, the said specimen is brought to an appropriate temperature, and the standard temperature at which hot mixed bituminous paving mixtures and stabilized soil mixtures are tested is 140° F. The specimen is brought to this temperature by immersion of the specimen for a period of one hour in water having a temperature of 140° F. Immediately after bringing the specimen to the appropriate temperature, the stability and flow value of the specimen are determined at the same time by testing in machine A. Load application is accomplished by means of screw jack G mounted in the testing machine frame, and the load is measured by means of the resilient proving ring R and deflection or flexure measuring dial I. Load applied to the proving ring R through the specimen causes deflection or flexure of the proving ring R, and the degree to which proving ring R is deflected or flexed is measured by means of the deflection measuring dial I. The number of pounds required to cause any given deflection of the ring R is determined prior to its use as a load-measuring device, and a calibration chart is used to convert flection readings to pounds. The specimen is centered on edge in the lower arc member 22 of test mold B, and the upper arc member 23 of mold B is fitted so as to be guided to testing position of the specimen by guide rods 24 and 24' fixed in ears 24a and 24b provided on opposite sides of the lower arc member 22, said rods slidably extending through ears 24c and 24d provided on opposite sides of the upper arc member 23 and through sleeves 24e and 24f fixed to and depending from the ears 24c and 24d. This assembly is then placed on the head 8 of screw jack G and centered under the contact pin 5, as shown in Figure 1. The deformation indicating device C is then placed in testing position over guide rod 24 of test mold B, and jack crank 10 is turned to force the top of the test mold B against pin 5. Sufficient downward hand pressure on the outer sleeve 33 of the device C is exerted to maintain the same against the upper arc member 23 of the test mold during testing. The graduated plunger or indicator 32 of the device C is slidably fitted in the sleeve member 33 thereof, and is of substantially the same diameter as guide rod 24 so that the latter may move upwardly into said sleeve 33. Jack crank 10 is then turned at a uniform set rate per second until the reading on load measuring dial I reaches its maximum and begins to recede toward zero. The pressure on outer sleeve 33 of the device C is instantly released the moment the pointer of load-measuring dial I begins to recede from the maximum reading. This maximum load reading obtained in this way during testing is recorded, and such reading is converted into pounds from the calibration chart furnished with the proving ring assembly. The reading in pounds is recorded as the stability value of the mixture. The number of graduations of the core 32 of device C which protrude above the top of the sleeve 33 gives a reading which is recorded as the flow value of the mixture.

Flow of bituminous pavements under wheel load of parked vehicles will occur if the paving mixture is excessively plastic in nature. The plastic nature of the mixture is indicated by the flow value obtained during testing for stability, and the flow value is an index to the degree that a specimen will deform up to the point that failure occurs. This value is obtained, as has been shown, by lightly pressing the outer sleeve of the deformation indicating device C against the upper arc member of the stability mold and over the guide rod 24. Pressure against the sleeve 33 of the device C is released instantly when the stability load reaches its maximum value. For calibration to zero, the device C is placed in position for testing when a freshly formed specimen is contained in the test mold. In this position, the device C is adjusted to read zero when its inside indicator or plunger 32 is against the guide rod 24 and the outer sleeve 33 is against the upper arc of the test mold. Graduations are marked on the indicator or plunger 32, and the number of divisions protruding above the top of the outer sleeve 33 after testing for stability is recorded as the flow value of the mixture.

The present method of measuring stability of bituminous paving mixtures is defined as a semiconfined compression shear test. The total mass of the specimen is subjected to the applied stresses, and shear planes produced by failure result in separation of the specimen into four segments. Visualizing the failed specimen resting on its rounded or annular edge, the two end segments of the specimen are practically identical. The tendency is toward reproduction of identical shear planes in all specimens. This tendency is brought about by the distribution of forces applied by the test mold, and coarse aggregates contained in a specimen tend to shift the normal planes of shear and to thereby produce stability results higher than those containing fine aggregates. Within limits, the higher the proportion of coarse to fine aggregates, the greater the diversion of the shear planes from their normal paths, thereby yielding higher stability values. The stability value obtained is a measure of the resistance to slippage of the entire masses of the specimen. Value of a bituminous pavement under load is a result of the masses slipping, and if shear occurs, the pavement is not sufficiently stable to resist the load. If excessive flow occurs without shear, the pavement is excessively plastic in nature, and for this reason rutting and shoving can be prevented by controlling the stability of the paving mixture. The stability of a paving mixture should not be below that required to prevent shear under stresses to which the pavement is to be subjected.

As shown clearly in Figures 2 and 3, the compaction mold D consists of a circular base plate 31 having a reduced upper portion 37 fitting into the cylindrical body 28 of the mold, and a removable ring 27 having a rabbeted lower end fitting over the reduced upper end 28' of the body 28. The ring 27 is latched to the body 28 by means of notched latch members 29 provided on opposite sides of ring 27 and engageable with pins 30 provided on opposite sides of body 28. As shown in Figure 2, the internal diameter of removable ring 27 is slightly greater than the internal diameter of cylindrical body 28.

The compaction head F simply consists of a circular plunger having a central rod or stem 26. Also, contact pin 5 is slidable in a bushing 40 provided in a central opening of cross piece 8', and has a head 41 at its upper end engageable with cross piece 8' to prevent the pin from falling through the bushing 40 and to contact the bottom of proving ring R. The graduations on the indicator or plunger 32 of the deformation indicating device C are indicated at 42 in Figure 8. As shown clearly in Figures 1, 5 and 6, the test mold B includes a base plate 25 to which is securely fastened the lower arc member 22, and which is adapted to flatly rest upon the head 8 of jack G. A slight segmento-spherical depression or recess 35 is provided centrally in the upper surface of the upper arc member 23 of the mold B to provide a seat for reception of the lower end of contact pin 5 when the test mold is in position for testing a specimen.

The screw jack G has a worm shaft 43 whose worm meshes with a worm gear 44 formed on a hub member 45 which threadedly receives the adjusting screw 46 of the jack. Crank 10 is removably secured on a projecting end of shaft 43, and another shaft 47 is journaled in the front of the casing 48 of the jack G and is adapted for removable reception of the crank 10 when removed from the shaft 43. This second operating shaft 47 is operatively connected with the shaft 43 through a reduction gearing generally indicated by dotted lines at 49 in Figure 1. Thus, the screw jack has two gear ratios. The shaft 43 is operated to move the jack head 8 at the rate of one inch to every 60 revolutions of said shaft 43, while the shaft 47 is operated to move the jack head 8 at the rate of $\frac{1}{8}$ of an inch to 60 revolutions of said shaft 47. Shaft 43 is used for applying loads not exceeding 1,500 pounds on the jack head, and is intended only for use in testing asphalt paving specimens. The maximum load which may be applied on the jack head by use of the shaft 47 is 8,000 pounds, and this shaft is used for the compression loads and soil testing. While the screw jack is shown as provided with a hand lever, it is obvious that the same may be motor driven for raising or lowering the jack head.

It will be understood that the proving ring R and the deflection dial may be removed from the testing machine frame. For this purpose, the upper portion of ring R is clamped between a disc 50 and a clamping bar 51 which are drawn together by bolts 52, and disc 50 is detachably secured to the under side of cross piece 7 by means of bolts 53. The dial I has a rearwardly extending arm 54 which slidably receives the lower end of a vertical rod 55 fixed to and depending from one end of clamping bar 51 and having nuts 56 threaded on the lower end portion thereof above and below the arm 54. By adjusting nuts 56, the dial I may be vertically adjusted to cause its pointer-actuating contact pin 57 to properly contact the ring R so that the reading will be zero when the ring R is normal or unflexed. It will also be noted that the disc 50 has a threaded socket 58 in the top thereof centrally of the same, which socket is of the same size as the reduced upper end 59 of the screw 46 of jack G. The head 8 is removable from this reduced end 59 so that the latter may be threaded into the socket 58 of the disc 50 of the removable proving ring assembly when this assembly is removed and inverted. This association of the screw jack and the proving ring assembly may be used as a load-measuring device. Also, if desired, the proving ring assembly and the screw jack can be used separately for other purposes.

It is to be understood that the apparatus is also used for testing, for stability and flow and proper compaction, a core from any bituminous paving mixture or stabilized soil mixture pavement, and the pavement can be tested from time to time to check stability, flow and degree of compaction.

What I claim as new is:

1. In an apparatus of the character described, a unitary testing mold for circular disk-like compacted specimens of paving mixtures, comprising spaced similar upper and lower narrow segmento-cylindrical mold members of less than semi-circular length and of a curvature conforming to the circular surface of the specimen, coacting guide rods and guide sleeves carried by the mold members, for slidably guiding said mold members for movement toward each other radially of the specimen, and means to removably support the lower mold member in a vertical position upon a jack head.

2. In an apparatus of the character described, a testing mold for circular compacted specimens of paving mixtures, comprising upper and lower arcuate mold members, means for slidably guiding said mold members for movement relative to each other, and means to support the lower mold member upon a jack head, said guiding means including guide rods carried by the lower mold member and slidable through the upper mold member, and a deformation indicating device for measuring deformation of the specimen in the mold including a sleeve positionable on the upper mold member and a graduated plunger in said sleeve movable by one of the guide rods.

3. A load measuring device comprising an upright frame, a load applying jack mounted in the bottom of said frame and including a vertically movable lifting screw, a cross-piece fixed in the frame above said jack and having a central opening, a load measuring unit mounted within said frame, said unit embodying a resilient ring and a flexure measuring dial fixed to said ring at one side of the latter and having a pointer actuating contact pin engaging the inner surface of said ring at the diametrically opposite side of the latter, and a headed work load applying pin extending through and slidable in said opening of the cross-piece, the head of said work load applying-pin engaging the outer surface of said opposite side of said ring.

4. In an apparatus for testing the stability value of a compacted circular disk-like specimen of a paving mixture, a vertical elongated frame, a load measuring device mounted within the upper end portion of said frame, a jack mounted within the lower end portion of said frame and arranged for imposing a load in a direction toward said load measuring device, and a unitary specimen testing mold removably disposed between and engaged by said load measuring device and said jack, said mold including upper and lower relatively movable spaced segmento-cylindrical members shaped to conform to opposed portions of the cylindrical surface of the specimen.

5. In an apparatus for testing the stability value of a compacted circular disk-like specimen of a paving mixture, a vertical elongated frame, a load measuring device mounted within the upper end portion of said frame, a jack mounted within the lower end portion of said frame and arranged for imposing a load in a direction toward said load measuring device, and a unitary specimen testing mold removably disposed between and engaged by said load measuring device and said jack, said mold including upper and lower relatively movable spaced segmento-cylindrical members shaped to conform to opposed portions of the cylindrical surface of the specimen, and coacting guide rods and guide sleeves carried by the respective arcuate members for guiding the latter in their movement toward each other.

BRUCE G. MARSHALL.

REFERENCES CITED

The following references are of record in the file of this patent:

UNITED STATES PATENTS

| Number | Name | Date |
|---|---|---|
| 244,943 | Springer | July 26, 1881 |
| 882,731 | Alexander | Mar. 24, 1908 |
| 1,300,790 | Tretch | Apr. 15, 1919 |
| 1,630,110 | Cole | May 24, 1927 |
| 1,696,148 | Camp | Dec. 18, 1928 |
| 1,877,367 | Seppmann | Sept. 13, 1932 |
| 1,931,925 | Hopkins | Oct. 24, 1933 |
| 2,041,869 | Smith et al. | May 26, 1936 |
| 2,049,644 | Essen | Aug. 4, 1936 |
| 2,107,113 | Gogan | Feb. 1, 1938 |
| 2,303,621 | Donnelly et al. | Dec. 1, 1942 |
| 2,325,026 | Anway | July 27, 1943 |
| 2,325,027 | Anway | July 27, 1943 |
| 2,327,241 | Berger | Aug. 17, 1943 |
| 2,350,722 | Buckingham | June 6, 1944 |
| 2,373,469 | Grime | Apr. 10, 1945 |